(12) United States Patent
Seidel et al.

(10) Patent No.: US 8,318,857 B2
(45) Date of Patent: Nov. 27, 2012

(54) IMPACT-MODIFIED POLYCARBONATE COMPOSITIONS

(75) Inventors: Andreas Seidel, Dormagen (DE); Achim Feldermann, Dusseldorf (DE)

(73) Assignee: Bayer MaterialScience AG, Leverkusen (DE)

(*) Notice: Subject to any disclaimer, the term of this patent is extended or adjusted under 35 U.S.C. 154(b) by 0 days.

(21) Appl. No.: 12/009,217

(22) Filed: Jan. 17, 2008

(65) Prior Publication Data

US 2008/0176988 A1 Jul. 24, 2008

(30) Foreign Application Priority Data

Jan. 19, 2007 (DE) .......................... 10 2007 002 925

(51) Int. Cl.
*C08L 51/04* (2006.01)
*C08L 83/10* (2006.01)
(52) U.S. Cl. ........................ 525/67; 525/64; 525/479
(58) Field of Classification Search .................. 524/504; 525/479, 64, 67
See application file for complete search history.

(56) References Cited

U.S. PATENT DOCUMENTS

| | | | | |
|---|---|---|---|---|
| 3,655,824 A | | 4/1972 | Kato et al. ..................... 260/873 |
| 4,550,138 A | | 10/1985 | Paddock et al. ................. 525/67 |
| 5,025,066 A | | 6/1991 | DeRudder et al. ............... 525/66 |
| 5,026,777 A | * | 6/1991 | Jalbert et al. .................... 525/65 |
| 5,079,293 A | | 1/1992 | Alsamarraie et al. ........... 525/66 |
| 5,369,154 A | * | 11/1994 | Laughner ........................ 523/436 |
| 5,602,201 A | * | 2/1997 | Fujiguchi et al. ............... 525/67 |
| 5,723,526 A | | 3/1998 | Nagasawa ....................... 524/451 |
| 6,197,857 B1 | | 3/2001 | Nodera et al. .................. 524/141 |
| 6,232,397 B1 | | 5/2001 | Weber et al. ..................... 525/67 |
| 6,417,319 B1 | | 7/2002 | Shibuya et al. ................. 528/196 |
| 6,576,706 B1 | * | 6/2003 | Nodera et al. ................... 525/67 |
| 6,613,820 B2 | * | 9/2003 | Fujiguchi et al. .............. 524/109 |

OTHER PUBLICATIONS

Chiantore, Compositional Characterization of AES Blends by Size-Exclusion and Precipitation-Redissolution Liquid Chromatography, Ind. Eng. Chem. Res. 1997, 36, p. 1276-1282.*

* cited by examiner

*Primary Examiner* — Ling Choi
*Assistant Examiner* — Brieann R Fink
(74) *Attorney, Agent, or Firm* — Baker, Donelson, Bearman, Caldwell and Berkowitz PC

(57) ABSTRACT

The present invention relates to filled, impact-modified polycarbonate compositions containing
A) aromatic polycarbonate and/or aromatic polyester carbonate,
B) a first graft polymer of
  B.1 from 0.1 to 30 wt. % of at least one vinyl monomer on
  B.2 from 99.9 to 70 wt. % of one or more graft bases having glass transition temperatures <10° C., the graft base consisting of at least 50 wt. % of a silicone rubber,
C) a second graft polymer, which is different from component B, of
  C.1 from 5 to 95 wt. % of at least one vinyl monomer on
  C.2 from 95 to 5 wt. % of one or more graft bases having glass transition temperatures <10° C., the graft base consisting of at least 50 wt. % of an EPDM rubber,
D) rubber-free vinyl (co)polymer and/or polyalkylene terephthalate, and
E) polymer additives,
wherein components B and C are present in a ratio (B:C) in the range from 20:80 to 80:20 and
wherein the composition contains
  from 10 to 92 parts by weight of component A,
  from 8 to 90 parts by weight of the sum of components B and C,
  from 0 to 35 parts by weight of component D, and
  from 0 to 30 parts by weight of component E,
which have good stability to ageing and which are distinguished by high low-temperature strength and by low gloss, to a process for their production and to their use in the production of molded bodies.

13 Claims, No Drawings

IMPACT-MODIFIED POLYCARBONATE COMPOSITIONS

CROSS-REFERENCE TO RELATED APPLICATION

This application claims priority under 35 U.S.C. 119(a-d) to German application No. DE 10 2007 002925, filed Jan. 19, 2007.

FIELD OF THE INVENTION

The present invention relates to impact-modified polycarbonate compositions and moulding compositions having good ageing stability, which are distinguished by low gloss and good low-temperature strength, to a process for their production and to their use in the production of moulded bodies.

BACKGROUND OF THE INVENTION

Although compositions containing polycarbonate and impact modifiers based on EPDM rubber (e.g. AES) or acrylate rubber (ASA) are stable to ageing as compared with corresponding PC/ABS compositions, they generally have inadequate low-temperature strength. Compositions containing polycarbonate and impact modifiers based on silicone rubbers or silicone-rich silicone-acrylate composite rubbers are stable to ageing as compared with corresponding PC/ABS compositions and generally also have good low-temperature strength, but mouldings produced therefrom are distinguished by a high-gloss surface appearance. In order to avoid lacquering the components after injection moulding, components produced from such compositions are often required to have a low-gloss surface.

DE-OS 2 037 419 discloses moulding compositions containing polycarbonate and rubber-like acrylate polymers (for example a graft polymer of acrylonitrile and styrene on acrylate rubber, referred to as ASA hereinbelow) which have improved resistance to the formation of hairline cracks and to weathering as compared with corresponding polycarbonate/ABS compositions.

U.S. Pat. No. 4,550,138 discloses moulding compositions containing from 60 to 97 wt. % polycarbonate and from 3 to 40 wt. % AES graft copolymer having a rubber content of from 30 to 80 wt. %, which are distinguished as compared with pure polycarbonate in that they have improved strength while their dimensional stability under heat is not substantially impaired.

EP-A 0 369 201 discloses compositions containing polycarbonate, a graft copolymer based on polysiloxane, and a graft copolymer based on diene rubber (for example ABS).

WO-A 98/008900 discloses moulding compositions containing aromatic polycarbonate, a graft polymer based on alkyl acrylates, styrenes and unsaturated nitrites, a copolymer based on styrenes and unsaturated nitrites, a siloxane network rubber (based on silicone/acrylate), a copolymer of at least two different esters of acrylic acid or methacrylic acid, and optionally further components. The moulding compositions are strong at low temperatures and flow readily, no mention being made of the gloss of the resulting moulding compositions.

SUMMARY OF THE INVENTION

The object of the present invention is to provide a moulding composition which is distinguished by high low-temperature strength and by low gloss with high stability to heat ageing.

It has been found, surprisingly, that compositions containing

A) aromatic polycarbonate and/or aromatic polyester carbonate,
B) a first graft polymer of
   B.1 from 0.1 to 30 wt. %, preferably from 5 to 20 wt. %, of at least one vinyl monomer on
   B.2 from 99.9 to 70 wt. %, preferably from 95 to 80 wt. %, of one or more graft bases having glass transition temperatures <10° C., preferably <0° C., particularly preferably <−20° C., the graft base consisting of at least 50 wt. % of a silicone rubber,
C) a second graft polymer, which is different from component B, of
   C.1 from 5 to 95 wt. %, preferably from 20 to 90 wt. %, of at least one vinyl monomer on
   C.2 from 95 to 5 wt. %, preferably from 80 to 10 wt. %, of one or more graft bases having glass transition temperatures <10° C., preferably <0° C., particularly preferably <−20° C., the graft base consisting of at least 50 wt. % of an EPDM rubber,
D) optionally rubber-free vinyl (co)polymer (D.1) and/or polyalkylene terephthalate (D.2), and
E) optionally polymer additives,
wherein the composition contains
   from 10 to 92 parts by weight, preferably from 30 to 80 parts by weight, particularly preferably from 40 to 75 parts by weight, of component A,
   from 8 to 90 parts by weight, preferably from 10 to 70 parts by weight, particularly preferably from 12 to 30 parts by weight, of the sum of components B and C,
   from 0 to 35 parts by weight, preferably from 1 to 30 parts by weight, particularly preferably from 4 to 28 parts by weight, of component D, and
   from 0 to 30 parts by weight, preferably from 0.1 to 10 parts by weight, particularly preferably from 0.1 to 5 parts by weight, of component E,
wherein components B and C are present in a ratio (B:C) in the range from 20:80 to 80:20, preferably from 25:75 to 75:25, particularly preferably from 35:65 to 45:55, and
wherein all parts by weight in the present application are so standardised that the sum of the parts by weight of components A+B+C+D+E in the composition is 100,
have the desired property profile.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

Component A

Aromatic polycarbonates and/or aromatic polyester carbonates which are suitable according to the invention as component A are known in the literature or can be prepared by processes which are known in the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates see, for example, DE-A 3 077 934).

The preparation of aromatic polycarbonates is carried out, for example, by reacting diphenols with carbonic acid halides, preferably phosgene, and/or with aromatic dicarboxylic acid dihalides, preferably benzenedicarboxylic acid dihalides, by the phase boundary process, optionally using chain terminators, for example monophenols, and optionally using branching agents having a functionality of three or more, for example triphenols or tetraphenols. Preparation via a melt polymerisation process by reacting diphenols with, for example, diphenyl carbonate is also possible.

Diphenols for the preparation of aromatic polycarbonates and/or aromatic polyester carbonates are preferably those of formula (I)

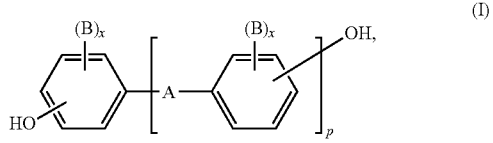

wherein
A represents a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, to which there may be fused other aromatic rings optionally containing hetero atoms,
or a radical of formula (II) or (III)

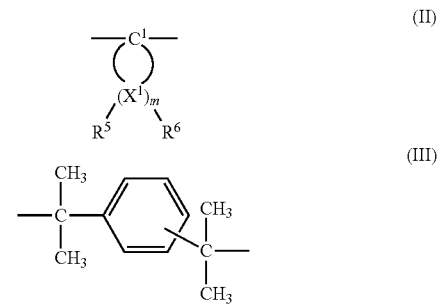

each of the substituents B represents $C_1$- to $C_{12}$-alkyl, preferably methyl, halogen, preferably chlorine and/or bromine,
the substituents x are each independently of the other 0, 1 or 2,
p represents 1 or 0, and
$R^5$ and $R^6$ can be selected individually for each $X^1$ and are each independently of the other hydrogen or $C_1$- to $C_6$-alkyl, preferably hydrogen, methyl or ethyl,
$X^1$ represents carbon, and
m represents an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl)sulfoxides, bis-(hydroxyphenyl) ketones, bis-(hydroxyphenyl)-sulfones and α,α-bis-(hydroxyphenyl)-diisopropyl-benzenes and their derivatives brominated and/or chlorinated on the ring.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl-sulfone and their di- and tetra-brominated or -chlorinated derivatives, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. Particular preference is given to 2,2-bis-(4-hydroxyphenyl)-propane (bisphenol A). The diphenols can be used individually or in the form of any desired mixtures. The diphenols are known in the literature or obtainable by processes known in the literature.

Suitable chain terminators for the preparation of thermoplastic aromatic polycarbonates are, for example, phenol, p-chlorophenol, p-tert.-butylphenol or 2,4,6-tribromophenol, as well as long-chained alkylphenols, such as 4-[2-(2,4,4-trimethylpentyl)]-phenol, 4-(1,3-tetramethylbutyl)-phenol according to DE-A 2 842 005, or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol. The amount of chain terminators to be used is generally from 0.5 mol % to 10 mol %, based on the molar sum of the diphenols used in a particular case.

The thermoplastic aromatic polycarbonates have mean weight-average molecular weights ($M_w$, measured by GPC, ultracentrifugation or scattered light measurement, for example) of from 10,000 to 200,000 g/mol, preferably from 15,000 to 80,000 g/mol, particularly preferably from 24,000 to 32,000 g/mol. The thermoplastic aromatic polycarbonates can be branched in a known manner, preferably by the incorporation of from 0.05 to 2.0 mol %, based on the sum of the diphenols used, of compounds having a functionality of three or more, for example compounds having three or more phenolic groups.

Both homopolycarbonates and copolycarbonates are suitable. For the preparation of copolycarbonates according to the invention as component A, from 1 to 25 wt. %, preferably from 2.5 to 25 wt. %, based on the total amount of diphenols to be used, of polydiorganosiloxanes having hydroxyaryloxy terminal groups can also be used. These compounds are known (U.S. Pat. No. 3,419,634) and can be prepared by processes known in the literature. The preparation of copolycarbonates containing polydiorganosiloxanes is described in DE-A 3 334 782.

In addition to the homopolycarbonates of bisphenol A, preferred polycarbonates are the copolycarbonates of bisphenol A containing up to 15 mol %, based on the molar sum of diphenols, of diphenols other than those mentioned as being preferred or particularly preferred, especially 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Particular preference is given to mixtures of the diacid dichlorides of isophthalic acid and terephthalic acid in a ratio of from 1:20 to 20:1.

In the preparation of polyester carbonates, a carbonic acid halide, preferably phosgene, is additionally used concomitantly as bifunctional acid derivative.

In addition to the monophenols already mentioned, there come into consideration as chain terminators for the preparation of aromatic polyester carbonates also the chlorocarbonic acid esters of the mentioned monophenols and the acid chlorides of aromatic monocarboxylic acids, which can optionally be substituted by $C_1$- to $C_{22}$-alkyl groups or by halogen atoms, as well as aliphatic $C_2$- to $C_{22}$-mono-carboxylic acid chlorides.

The amount of chain terminators is in each case from 0.1 to 10 mol %, based in the case of phenolic chain terminators on moles of diphenol and in the case of monocarboxylic acid chloride chain terminators on moles of dicarboxylic acid dichloride.

The aromatic polyester carbonates can also contain aromatic hydroxycarboxylic acids incorporated therein.

The aromatic polyester carbonates can be either linear or branched in a known manner (see in this connection DE-A 2 940 024 and DE-A 3 007 934).

There can be used as branching agents, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol %, based on diphenols used. Phenolic branching agents can be placed in the reaction vessel with the diphenols, acid chloride branching agents can be introduced together with the acid dichlorides.

The content of carbonate structural units in the thermoplastic aromatic polyester carbonates can vary as desired. The carbonate group content is preferably up to 100 mol %, especially up to 80 mol %, particularly preferably up to 50 mol %, based on the sum of ester groups and carbonate groups. Both the esters and the carbonates contained in the aromatic polyester carbonates can be present in the polycondensation product in the form of blocks or in a randomly distributed manner.

The relative solution viscosity ($\eta_{rel}$) of the aromatic polycarbonates and polyester carbonates is in the range from 1.18 to 1.4, preferably from 1.20 to 1.32 (measured on solutions of 0.5 g of polycarbonate or polyester carbonate in 100 ml of methylene chloride solution at 25° C.).

The thermoplastic aromatic polycarbonates and polyester carbonates can be used alone or in any desired mixture.

Component B

Component B comprises a first graft polymer of
B.1 from 0.1 to 30 wt. %, preferably from 5 to 20 wt. %, of at least one vinyl monomer on
B.2 from 99.9 to 70 wt. %, preferably from 95 to 80 wt. %, of one or more graft bases having a glass transition temperature <10° C., preferably <0° C., particularly preferably <−20° C., the graft base consisting of at least 50 wt. % of a silicone rubber.

The graft base B.2 generally has a mean particle size ($d_{50}$ value) of from 0.05 to 10 µm, preferably from 0.05 to 5 µm, particularly preferably from 0.1 to 1 µm.

Monomers B.1 preferably consist of vinyl monomers selected from
B.1.1 a first group consisting of (meth)acrylic acid ($C_1$-$C_8$)-alkyl esters (such as methyl methacrylate, ethyl methacrylate, n-butyl acrylate, tert.-butyl acrylate) and/or
B.1.2 a second group consisting of vinyl aromatic compounds and/or vinyl aromatic compounds substituted on the ring (such as styrene, α-methylstyrene, p-methylstyrene, p-chlorostyrene) and/or vinyl cyanides (unsaturated nitrites such as acrylonitrile and methacrylonitrile) and/or derivatives (such as anhydrides and imides) of unsaturated carboxylic acids, for example maleic anhydride and N-phenyl-maleimide.

In a preferred embodiment of the invention, at least 50 wt. % of the monomers B.1 are selected from the first group B.1.1. In a particularly preferred embodiment, the monomers B.1 consist of at least 50 wt. %, preferably at least 80 wt. %, especially at least 95 wt. %, based on component B.1, methyl methacrylate.

Suitable graft bases B.2 for the graft polymers B consist preferably of at least 50 wt. %, particularly preferably from 70 to 100 wt. %, most particularly preferably from 70 to 98 wt. %, silicone rubber and up to 50 wt. %, particularly preferably up to 30 wt. %, most particularly preferably from 2 to 30 wt. %, of one or more rubbers selected from the group consisting of diene rubbers, EP(D)M rubbers (i.e. rubbers based on ethylene/propylene and optionally diene), acrylate, polyurethane, silicone, chloroprene and ethylene/vinyl acetate rubbers.

Particularly preferred graft bases B.2 are mixtures of at least 50 wt. %, most preferably from 70 to 98 wt. %, silicone rubber with up to 50 wt. %, most preferably from 2 to 30 wt. %, acrylate rubber, wherein the two rubber types, because of their production, form an interpenetrating network or alternatively can be present in the form of a core-shell structure.

The gel content of the graft base B.2 is particularly preferably at least 30 wt. %, most particularly preferably at least 40 wt. % (measured in toluene).

The graft copolymers B are prepared by free-radical polymerisation, for example by emulsion, suspension, solution or mass polymerisation, preferably by emulsion or mass polymerisation, particularly preferably by emulsion polymerisation.

Because it is known that the graft monomers are not necessarily grafted completely onto the graft base during the graft reaction, graft polymers B according to the invention are also understood as being those products which are obtained by (co)polymerisation of the graft monomers in the presence of the graft base and are also obtained during the working up.

Suitable acrylate rubbers according to B.2 for the polymers B are preferably polymers of acrylic acid alkyl esters, optionally with up to 40 wt. %, based on B.2, of other polymerisable, ethylenically unsaturated monomers. The preferred polymerisable acrylic acid esters include $C_1$- to $C_8$-alkyl esters, for example methyl, ethyl, butyl, n-octyl and 2-ethylhexyl esters; haloalkyl esters, preferably halo-$C_1$-$C_8$-alkyl esters, such as chloroethyl acrylate, as well as mixtures of those monomers.

For crosslinking, monomers having more than one polymerisable double bond can be copolymerised. Preferred examples of crosslinking monomers are esters of unsaturated monocarboxylic acids having from 3 to 8 carbon atoms and of unsaturated monohydric alcohols having from 3 to 12 carbon atoms, or of saturated polyols having from 2 to 4 OH groups and from 2 to 20 carbon atoms, such as ethylene glycol dimethacrylate, allyl methacrylate; polyunsaturated heterocyclic compounds, such as trivinyl and triallyl cyanurate; polyfunctional vinyl compounds, such as di- and tri-vinylbenzenes; and also triallyl phosphate and diallyl phthalate. Preferred crosslinking monomers are allyl methacrylate, ethylene glycol dimethacrylate, diallyl phthalate and heterocyclic compounds having at least three ethylenically unsaturated groups. Particularly preferred crosslinking monomers are the cyclic monomers triallyl cyanurate, triallyl isocyanurate, triacryloylhexahydro-s-triazine, triallylbenzenes. The amount of crosslinking monomers is preferably from 0.02 to 5 wt. %, especially from 0.05 to 2 wt. %, based on the graft base B.2. In the case of cyclic crosslinking monomers having at least three ethylenically unsaturated groups, it is advantageous to limit the amount to less than 1 wt. % of the graft base B.2.

Preferred "other" polymerisable, ethylenically unsaturated monomers which can optionally be used, in addition to the acrylic acid esters, for the preparation of the graft base B.2 are, for example, acrylonitrile, styrene, α-methylstyrene, acrylamides, vinyl $C_1$-$C_6$-alkyl ethers, methyl methacrylate, butadiene. Preferred acrylate rubbers as graft base B.2 are emulsion polymers having a gel content of at least 60 wt. %.

Other suitable graft bases according to B.2 are silicone rubbers having graft-active sites, as are described in DE-OS 3 704 657, DE-OS 3 704 655, DE-OS 3 631 540 and DE-OS 3 631 539.

The gel content of the graft base B.2 is determined at 25° C. in a suitable solvent (M. Hoffmann, H. Krömer, R. Kuhn, Polymeranalytik I und II, Georg Thieme-Verlag, Stuttgart 1977).

The mean particle size $d_{50}$ is the diameter above and below which in each case 50 wt. % of the particles lie. It can be determined by means of ultracentrifuge measurement (W. Scholtan, H. Lange, Kolloid. Z. und Z. Polymere 250 (1972), 782-796).

Component C

Component C comprises a second graft polymer, which is different from component B, of C.1 from 5 to 95 wt. %, preferably from 30 to 90 wt. %, of at least one vinyl monomer on C.2 from 95 to 5 wt. %, preferably from 70 to 10 wt. %, of one or more graft bases having glass transition temperatures <10° C., preferably <0° C., particularly preferably <−20° C., the graft base consisting of at least 50 wt. % of an EPDM rubber.

The graft base C.2 generally has a mean particle size ($d_{50}$ value) of from 0.05 to 10 μm, preferably from 0.1 to 5 μm, particularly preferably from 0.2 to 1 μm.

Monomers C.1 are preferably mixtures of

C.1.1 from 50 to 99 parts by weight of vinyl aromatic compounds and/or vinyl aromatic compounds substituted on the ring (such as styrene, α-methylstyrene, p-methylstyrene, p-chlorostyrene) and/or (meth)acrylic acid ($C_1$-$C_8$)-alkyl esters (such as methyl methacrylate, ethyl methacrylate), and C.1.2 from 1 to 50 parts by weight of vinyl cyanides (unsaturated nitrites, such as acrylonitrile and methacrylonitrile) and/or (meth)acrylic acid ($C_1$-$C_8$)-alkyl esters, such as methyl methacrylate, n-butyl acrylate, tert.-butyl acrylate, and/or derivatives (such as anhydrides and imides) of unsaturated carboxylic acids, for example maleic anhydride and N-phenylmaleimide.

Preferred monomers C.1.1 are selected from at least one of the monomers styrene, α-methylstyrene and methyl methacrylate; preferred monomers C.1.2 are selected from at least one of the monomers acrylonitrile, maleic anhydride and methyl methacrylate. Particularly preferred monomers are C.1.1 styrene and C.1.2 acrylonitrile.

Suitable graft bases C.2 for the graft polymers C preferably consist of at least 50 wt. %, particularly preferably at least 80 wt. %, EPDM rubber (i.e. rubbers based on ethylene/propylene and a diene) and of up to 50 wt. %, particularly preferably up to 20 wt. %, of one or more rubbers selected from the group consisting of diene rubbers, silicone rubbers, acrylate, polyurethane, silicone, chloroprene and ethylene/vinyl acetate rubbers.

The particularly preferred graft base C.2 consists of pure EPDM rubber, that is to say of a rubber based on ethylene/propylene and a diene, the diene preferably being 5-ethylidene-2-norbornene.

The gel content of the graft base C.2 is preferably at least 30 wt. %, particularly preferably at least 40 wt. % (measured in toluene).

The graft copolymers C are prepared by free-radical polymerisation, for example by emulsion, suspension, solution or mass polymerisation, preferably by emulsion or mass polymerisation.

Because it is known that the graft monomers are not necessarily grafted completely onto the graft base during the graft reaction, graft polymers C according to the invention are also understood as being those products which are obtained by (co)polymerisation of the graft monomers in the presence of the graft base and are also obtained during the working up.

The gel content of the graft base C.2 is determined at 25° C. in a suitable solvent (M. Hoffmann, H. Krömer, R. Kuhn, Polymeranalytik I und II, Georg Thieme-Verlag, Stuttgart 1977).

The mean particle size $d_{50}$ is the diameter above and below which in each case 50 wt. % of the particles lie. It can be determined by means of ultracentrifuge measurement (W. Scholtan, H. Lange, Kolloid, Z. und Z. Polymere 250 (1972), 782-1796).

Component D

Component D comprises one or more thermoplastic vinyl (co)polymers D.1 and/or polyalkylene terephthalates D.2.

Suitable vinyl (co)polymers D.1 are polymers of at least one monomer from the group of the vinyl aromatic compounds, vinyl cyanides (unsaturated nitriles), (meth)acrylic acid ($C_1$-$C_8$)-alkyl esters, unsaturated carboxylic acids and derivatives (such as anhydrides and imides) of unsaturated carboxylic acids. Particularly suitable are (co)polymers of D.1.1 from 50 to 99 parts by weight, preferably from 60 to 80 parts by weight, of vinyl aromatic compounds and/or vinyl aromatic compounds substituted on the ring (such as styrene, α-methylstyrene, p-methylstyrene, p-chlorostyrene) and/or (meth)acrylic acid ($C_1$-$C_8$)-alkyl esters (such as methyl methacrylate, ethyl methacrylate), and D.1.2 from 1 to 50 parts by weight, preferably from 20 to 40 parts by weight, of vinyl cyanides (unsaturated nitriles), such as acrylonitrile and methacrylonitrile, and/or (meth) acrylic acid ($C_1$-$C_8$)-alkyl esters, such as methyl methacrylate, n-butyl acrylate, tert.-butyl acrylate, and/or unsaturated carboxylic acids, such as maleic acid, and/or derivatives, such as anhydrides and imides, of unsaturated carboxylic acids (for example maleic anhydride and N-phenylmaleimide).

The vinyl (co)polymers D.1 are resin-like, thermoplastic and rubber-free. Particular preference is given to the copolymer of D.1.1 styrene and D.1.2 acrylonitrile.

The (co)polymers according to D.1 are known and can be prepared by free-radical polymerisation, in particular by emulsion, suspension, solution or mass polymerisation. The (co)polymers preferably have mean molecular weights Mw (weight-average, determined by light scattering or sedimentation) of from 15,000 to 200,000.

The polyalkylene terephthalates of component D.2 are reaction products of aromatic dicarboxylic acids or their reactive derivatives, such as dimethyl esters or anhydrides, and aliphatic, cycloaliphatic or araliphatic diols, as well as mixtures of such reaction products.

Preferred polyalkylene terephthalates contain at least 80 wt. %, preferably at least 90 wt. %, based on the dicarboxylic acid component, terephthalic acid radicals and at least 80 wt.

%, preferably at least 90 mol %, based on the diol component, ethylene glycol and/or 1,4-butanediol radicals.

As well as containing terephthalic acid radicals, the preferred polyalkylene terephthalates can contain up to 20 mol %, preferably up to 10 mol %, radicals of other aromatic or cycloaliphatic dicarboxylic acids having from 8 to 14 carbon atoms or of aliphatic dicarboxylic acids having from 4 to 12 carbon atoms, such as, for example, radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

As well as containing ethylene glycol or 1,4-butanediol radicals, the preferred polyalkylene terephthalates can contain up to 20 mol %, preferably up to 10 mol %, of other aliphatic diols having from 3 to 12 carbon atoms or of cycloaliphatic diols having from 6 to 21 carbon atoms, for example radicals of 1,3-propanediol, 2-ethyl-1,3-propanediol, neopentyl glycol, 1,5-pentanediol, 1,6-hexanediol, cyclohexane-1,4-dimethanol, 3-ethyl-2,4-pentanediol, 2-methyl-2,4-pentanediol, 2,2,4-trimethyl 1,3-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxy-phenyl)-propane and 2,2-bis-(4-hydroxypropoxyphenyl)-propane (DE-A 2 407 674, 2 407 776, 2 715 932).

The polyalkylene terephthalates can be branched by incorporation of relatively small amounts of tri- or tetra-hydric alcohols or tri- or tetra-basic carboxylic acids, for example according to DE-A 1 900 270 and U.S. Pat. No. 3,692,744. Examples of preferred branching agents are trimesic acid, trimellitic acid, trimethylolethane, trimethylolpropane and pentaerythritol.

Particular preference is given to polyalkylene terephthalates that have been prepared solely from terephthalic acid and reactive derivatives thereof (e.g. dialkyl esters thereof) and ethylene glycol and/or 1,4-butanediol, and mixtures of such polyalkylene terephthalates.

Mixtures of polyalkylene terephthalates contain from 1 to 50 wt. %, preferably from 1 to 30 wt. %, polyethylene terephthalate and from 50 to 99 wt. %, preferably from 70 to 99 wt. %, polybutylene terephthalate.

The polyalkylene terephthalates that are preferably used generally have a limiting viscosity of from 0.4 to 1.5 dl/g, preferably from 0.5 to 1.2 dl/g, measured in phenol/o-dichlorobenzene (1:1 parts by weight) at 25° C. in an Ubbelohde viscometer.

The polyalkylene terephthalates can be prepared by known methods (see e.g. Kunststoff-Handbuch, Volume VIII, p. 695 ff, Carl-Hanser-Verlag, Munich 1973).

Component E

The composition can contain further commercially available polymer additives such as flameproofing agents, flameproofing synergists, antidripping agents (for example compounds of the substance classes of the fluorinated polyolefins, the silicones and aramid fibres), lubricants and mould release agents (for example pentaerythritol tetrastearate), nucleating agents, stabilisers, antistatics (for example conductive carbon blacks, carbon fibres, carbon nanotubes as well as organic antistatics such as polyalkylene ethers, alkylsulfonates or polyamide-containing polymers), fillers and reinforcing materials (for example glass fibres or carbon fibres, mica, kaolin, talc, $CaCO_3$ and glass flakes) as well as colourings and pigments.

As flameproofing agents there are preferably used phosphorus-containing flameproofing agents, in particular selected from the groups of the monomeric and oligomeric phosphoric and phosphonic acid esters, phosphonate amines and phosphazenes, it also being possible to use as flameproofing agents mixtures of several components selected from one or various of these groups. Other halogen-free phosphorus compounds not mentioned specifically here can also be used, on their own or in any desired combination with other halogen-free phosphorus compounds. Examples of suitable phosphorus compounds are: tributyl phosphate, triphenyl phosphate, tricresyl phosphate, diphenylcresyl phosphate, diphenyloctyl phosphate, diphenyl-2-ethylcresyl phosphate, tri-(isopropylphenyl) phosphate, resorcinol-bridged di- or oligo-phosphate and bisphenol-A-bridged di- or oligo-phosphate. The use of oligomeric phosphoric acid esters derived from bisphenol A is particularly preferred. Phosphorus compounds suitable as flameproofing agents are known (see e.g. EP-A 0 363 608, EP-A 0 640 655) or can be prepared by known methods in an analogous manner (e.g. Ullmanns Enzyklopädie der technischen Chemie, Vol. 18, p. 301 ff 1979; Houben-Weyl, Methoden der organischen Chemie, Vol. 12/1, p. 43; Beilstein Vol. 6, p. 177).

Production of the Moulding Compositions and Moulded Bodies

The thermoplastic moulding compositions according to the invention are produced by mixing the respective constituents in a known manner and melt compounding and melt extruding the mixture at temperatures of from 200° C. to 300° C. in conventional devices such as internal kneaders, extruders and twin-shaft screws.

Mixing of the individual constituents can be carried out in a known manner either in succession or simultaneously, either at about 20° C. (room temperature) or at a higher temperature.

The invention relates also to processes for the production of the moulding compositions and to the use of the moulding compositions in the production of moulded bodies.

The moulding compositions according to the invention can be used in the production of moulded bodies of any kind. The moulded bodies can be produced, for example, by injection moulding, extrusion and blow moulding methods. A further form of processing is the production of moulded bodies by deep-drawing from previously produced sheets or films.

Examples of such moulded bodies are films, profiles, casing parts of any kind, e.g. for domestic appliances such as juice extractors, coffee machines, mixers; for office equipment, such as monitors, flat screens, notebooks, printers, copiers; sheets, tubes, conduits for electrical installations, windows, doors and other profiles for the construction sector (interior finishing and external applications) as well as electrical and electronics parts, such as switches, plugs and sockets, and also bodywork parts and interior components for commercial vehicles, in particular for the automotive sector.

In particular, the moulding compositions according to the invention can be used, for example, also in the production of the following moulded bodies or mouldings: interior fittings for railway vehicles, ships, aircraft, buses and other motor vehicles, casings for electrical devices containing small transformers, casings for devices for processing and transmitting information, casings and coverings for medical devices, massage devices and casings therefor, toy vehicles for children, flat prefabricated wall panels, casings for security devices, heat-insulated transport containers, mouldings for sanitary and bathroom fittings, grids for covering ventilation openings, and casings for gardening tools.

The Examples which follow serve to illustrate the invention further.

EXAMPLES

Component A

Linear polycarbonate based on bisphenol A having a weight-average molecular weight $\overline{M}_w$ of 27,500 g/mol (determined by GPC).

Component B1

Graft polymer consisting of 11 wt. % polymethyl methacrylate on 89 wt. % of a graft base consisting of 92 wt. % silicone rubber and 8 wt. % butyl acrylate rubber.

Component B2 (Comparison)

Graft polymer consisting of 28 wt. % styrene-acrylonitrile copolymer on 72 wt. % of a graft base of 46 wt. % silicone rubber and 54 wt. % butyl acrylate rubber.

Component B3 (Comparison)

Graft polymer consisting of 17 wt. % polymethyl methacrylate on 83 wt. % of a graft base consisting of 11 wt. % silicone rubber and 89 wt. % butyl acrylate rubber.

Component C1

Graft polymer consisting of 30 wt. % acrylonitrile and styrene on 70 wt. % of a graft base consisting of EPDM rubber, the diene being 5-ethylidene-2-norbornene. The mean particle size of the graft base ($d_{50}$) is about 250 nm.

Component C2 (Comparison)

Graft polymer consisting of 25% polymethyl methacrylate on 75% of a graft base of butyl acrylate rubber.

Component C3 (Comparison)

Graft polymer consisting of 39 wt. % acrylonitrile and styrene on 61 wt. % of a graft base of butyl acrylate rubber.

Component C4 (Comparison)

ABS polymer, prepared by emulsion polymerisation of 43 wt. %, based on the ABS polymer, of a mixture of 27 wt. % acrylonitrile and 73 wt. % styrene in the presence of 57 wt. %, based on the ABS polymer, of a particulate crosslinked polybutadiene rubber (mean particle diameter $d_{50}$=0.35 μm).

Component D

Styrene/acrylonitrile copolymer having a styrene/acrylonitrile weight ratio of 72:28 and a limiting viscosity of 0.55 dl/g (measured in dimethylformamide at 20° C.).

Component E

E1: pentaerythritol tetrastearate as lubricant/mould release agent
E2: phosphite stabiliser, Irganox® B 900, Ciba Speciality Chemicals
E3: Black Pearls 800, Cabot Europa G.I.E., Suresnes, France.
Production and Testing of the Moulding Compositions The materials listed in Table 1 are compounded at a melt temperature of 260° C. in a twin-screw extruder (ZSK-25) (Werner und Pfleiderer) at a speed of 225 rpm and a throughput of 25 kg/h and then granulated. The finished granules are processed on an injection-moulding machine to the corresponding test specimens (melt temperature 260° C., tool temperature 80° C., flow front speed 240 mm/s).

The following methods are used to characterise the properties of the test specimens:

The gloss of the plastics surfaces is evaluated in accordance with DIN 67 530 on test specimens having a size of 60 mm×40 mm×2 mm, at a measuring angle (also referred to hereinbelow as the angle of irradiation) of 20°.

The puncture test is carried out in accordance with ISO 6603-2 at a temperature of −30° C. In this test, the break patterns of a total of ten test specimens are evaluated as to whether non-splintering failure occurs in the majority of cases (at least 80%), that is to say in at least 8 out of 10 experiments.

For heat ageing, test specimens were stored at 100° C. for a period of 500 hours in accordance with DIN IEC 60216-1. The test specimens were then subjected to a puncture test in accordance with ISO 6603-2 at a temperature of −30° C.

TABLE

| Composition [wt. %] | Mechanical properties of the moulding compositions | | | | | | | |
|---|---|---|---|---|---|---|---|---|
| | 1 | 2 | 3 | 4 | 5 | 6 (comp.) | 7 (comp.) | 8 (comp.) |
| A | 57.08 | 57.08 | 57.08 | 57.08 | 71.32 | 57.08 | 57.08 | 57.08 |
| B1 | 4.92 | 6.89 | 8.86 | 12.79 | 8.57 | | 1.97 | 15.74 |
| B2 | | | | | | | | |
| B3 | | | | | | | | |
| C1 | 12.79 | 10.82 | 8.86 | 4.92 | 13.49 | 17.71 | 15.74 | 1.97 |
| C2 | | | | | | | | |
| C3 | | | | | | | | |
| C4 | | | | | | | | |
| D | 23.62 | 23.62 | 23.62 | 23.62 | 5.02 | 23.62 | 23.62 | 23.62 |
| E1 | 0.74 | 0.74 | 0.74 | 0.74 | 0.74 | 0.74 | 0.74 | 0.74 |
| E2 | 0.12 | 0.12 | 0.12 | 0.12 | 0.12 | 0.12 | 0.12 | 0.12 |
| E3 | 0.74 | 0.74 | 0.74 | 0.74 | 0.74 | 0.74 | 0.74 | 0.74 |
| Break pattern, puncture (−30° C.) | ductile | ductile | ductile | ductile | ductile | brittle | brittle | ductile |

TABLE-continued

Mechanical properties of the moulding compositions

| Break pattern after 500 h/100° C. | ductile | | | | | | brittle | ductile |
|---|---|---|---|---|---|---|---|---|
| Gloss (20°)[1] | 53.6 | 49.8 | 51.6 | 53.8 | 38.3 | 60.5 | 65 | 74.5 |

| Composition [wt. %] | 9 (comp.) | 10 (comp.) | 11 (comp.) | 12 (comp.) | 13 (comp.) | 14 (comp.) | 15 (comp.) | 16 (comp.) |
|---|---|---|---|---|---|---|---|---|
| A | 57.08 | 44.62 | 57.08 | 57.08 | 57.08 | 57.08 | 57.08 | 57.08 |
| B1 | 17.71 | 5.31 | | | 6.89 | 6.89 | 6.89 | |
| B2 | | | 6.89 | | | | | |
| B3 | | | | 6.89 | | | | |
| C1 | | 8.47 | 10.82 | 10.82 | | | | 10.82 |
| C2 | | | | | | | 10.82 | |
| C3 | | | | | | 10.82 | | |
| C4 | | | | | 10.82 | | | 6.89 |
| D | 23.62 | 40.00 | 23.62 | 23.62 | 23.62 | 23.62 | 23.62 | 23.62 |
| E1 | 0.74 | 0.74 | 0.74 | 0.74 | 0.74 | 0.74 | 0.74 | 0.74 |
| E2 | 0.12 | 0.12 | 0.12 | 0.12 | 0.12 | 0.12 | 0.12 | 0.12 |
| E3 | 0.74 | 0.74 | 0.74 | 0.74 | 0.74 | 0.74 | 0.74 | 0.74 |
| Break pattern, puncture (−30° C.) | ductile | brittle | ductile | brittle | ductile | ductile | ductile | ductile |
| Break pattern after 500 h/100° C. | | | | | | | | |
| Gloss (20°)[1] | 74.3 | 69.6 | 86.8 | 78.4 | 89.2 | 91.7 | 89.0 | 83.6 |

[1]angle of irradiation

The Examples show that the desired reduction in the surface gloss can be achieved only with the combination of B1 and C1—and also only in a limited concentration range.

It is clear from Examples 1 to 5 and Comparison Examples 6 to 9 that the reduction in the gloss occurs in the range from 20:80 to 80:20, based on the ratio of B1 to C1.

As is clear from Example 2 and Comparison Examples 11 and 12, a reduction in the gloss is only to be achieved using the specific silicone/acrylate modifier B1, but not with B2 or B3. The combination of B1 with impact modifiers based on polybutadiene (C4, Comparison Example 13) or acrylate (C2 and C3, Comparison Examples 14 and 15) does not achieve the aim. Nor does the combination of C1 with an impact modifier based on polybutadiene (C4, Comparison Example 16) achieve the desired combination of properties.

When using B1 and C1, a specific amount of SAN (component D) must also not be exceeded. With the same ratio A:B:C, the concentration of D was increased from 5.02 (Example 5) through 23.62 (Example 2) to 40 (Comparison Example 10). As is clear from the table, a reduced surface gloss was achieved in this series only in the case of Examples 2 and 5.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Compositions consisting of
A) aromatic polycarbonate and/or aromatic polyester carbonate,
B) a first graft polymer of
   B.1 from 0.1 to 30 wt. % of at least one vinyl monomer on
   B.2 from 99.9 to 70 wt. % of one or more graft bases having glass transition temperatures <10° C., the graft base consisting of at least 50 wt. % of a silicone rubber,
C) a second graft polymer, which is different from component B, of
   C.1 from 5 to 95 wt. % of at least one vinyl monomer on
   C.2 from 95 to 5 wt. % of one or more graft bases having glass transition temperatures <10° C., the graft base consisting of at least 50 wt. % of an EPDM rubber,
D) rubber-free vinyl (co)polymer and/or polyalkylene terephthalate, and
E) at least one polymer additive, selected from the group consisting of, antidripping agents, lubricants, release agents, nucleating agents, stabilizers, antistatics, fillers, reinforcing materials, colouring and pigments,
wherein components B and C are present in a ratio (B:C) in the range from 35:65 to 45:55,
wherein the composition contains
   from 40 to 57.08 parts by weight of component A,
   from 12 to 30 parts by weight of the sum of components B and C,
   from 0 to 35 parts by weight of component D,
   from 0 to 30 parts by weight of component E, and
wherein the compositions demonstrate low gloss.

2. Compositions according to claim 1, wherein the graft base B.2 consists of at least 50 wt. % silicone rubber and up to 50 wt. % of one or more rubbers selected from the group consisting of diene rubbers, EP(D)M rubbers, acrylate, polyurethane, silicone, chloroprene and ethylene/vinyl acetate rubbers.

3. Compositions according to claim 2, wherein the graft base B.2 is a mixture of from 70 to 98 wt. % silicone rubber and from 2 to 30 wt. % acrylate rubber.

4. Compositions according to claim 1, wherein the graft base C.2 consists of at least 50 wt. % EPDM rubbers and up to 50 wt. % of one or more rubbers selected from the group consisting of diene rubbers, silicone rubbers, acrylate, polyurethane, silicone, chloroprene and ethylene/vinyl acetate rubbers.

5. Compositions according to claim 4, wherein the graft base C.2 consists of EPDM rubber.

6. Moulded body containing a composition according to claim 1.

7. Moulded body according to claim 6, wherein the moulded body is part of a motor vehicle, of a railway vehicle, of an aircraft or of a water-craft or is a casing for electrical devices containing small transformers, a casing for devices for processing and transmitting information, a casing or covering for medical devices, massage devices and casings therefor, toy vehicles for children, flat prefabricated wall panels, casings for security devices, heat-insulated transport containers, mouldings for sanitary and bathroom fittings, grids for covering ventilation openings, or a casing for gardening tools.

8. The compositions according to claim 1, wherein said gloss is between 53.8 and 38.3.

9. The compositions according to claim 1, wherein said compositions need not be lacquered to have a low-gloss surface.

10. The compositions according to claim 1, wherein the compositions contain from 0 to 23.62 parts by weight of component D.

11. Compositions according to claim 1, wherein the monomer B.1 comprises from 5 to 20 wt. % of at least one vinyl monomer.

12. Compositions according to claim 1, wherein the monomer C.1 comprises from 20 to 90 wt. % of at least one vinyl monomer.

13. Compositions according to claim 1, wherein the composition contains from 4 to 28 parts by weight of component D and from 0.1 to 5 parts of by weight of component E.

* * * * *